(12) United States Patent
Czimmek

(10) Patent No.: US 8,616,474 B2
(45) Date of Patent: Dec. 31, 2013

(54) HIGH FLOW OUTWARD OPENING GASEOUS INJECTOR FOR AUTOMOTIVE APPLICATIONS

(75) Inventor: Perry Robert Czimmek, Williamsburg, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 298 days.

(21) Appl. No.: 13/229,071

(22) Filed: Sep. 9, 2011

(65) Prior Publication Data

US 2013/0062442 A1   Mar. 14, 2013

(51) Int. Cl.
B05B 1/30   (2006.01)

(52) U.S. Cl.
USPC .................................... 239/585.4; 239/585.1

(58) Field of Classification Search
USPC ............. 239/585.1, 585.3, 585.4, 585.5, 584, 239/533.2, 533.7, 533.9
See application file for complete search history.

(56) References Cited

U.S. PATENT DOCUMENTS

| 5,104,046 A * | 4/1992 | Sakagami ..................... 239/409 |
| 5,752,689 A | 5/1998 | Barkhimer |
| 7,422,166 B2 * | 9/2008 | Hoffmann et al. ......... 239/585.2 |
| 7,546,961 B2 * | 6/2009 | Cristiani et al. ........... 239/585.4 |
| 2006/0124771 A1 | 6/2006 | Catasus-Servia |

FOREIGN PATENT DOCUMENTS

EP   0879953 A1   11/1998

OTHER PUBLICATIONS

Search Report and the Written Opinion of the International Search Authority PCT/US2012/053866, Jul. 12, 2012.

* cited by examiner

*Primary Examiner* — Davis Hwu

(57) ABSTRACT

An injector (10) includes a valve body (16) having an interior portion (18) and a seat (32). An armature tube (20) is in the interior portion. A spring (28) biases a valve member (24) into engagement with the seat. A movable armature (40) is coupled to the armature tube. A calibration member (36) is engaged with the valve member and engaged with the spring. A stator (52) is coupled to an inlet tube (41) and has an end surface spaced from an end surface of the armature in the closed position of the injector, thereby defining an air gap (54) between the end surfaces. A coil (56) is disposed about a portion of the inlet tube. A housing (64) surrounds at least a portion of the coil. Magnetic flux causes the armature and armature tube to push the valve member off the seat.

20 Claims, 4 Drawing Sheets

HIGH FLOW OUTWARD OPENING GASEOUS INJECTOR FOR AUTOMOTIVE APPLICATIONS

FIELD OF THE INVENTION

The invention relates to fuel systems of internal combustion engines for vehicles and, more particularly, a high flow, outward opening gaseous injector.

BACKGROUND OF THE INVENTION

Conventional CNG injectors for automotive applications will not provide adequate flow for customer needs in the near future. To realize the needed flow, such injectors require high lift. However, higher lift for higher flow also introduces durability issues for the injector. Conventional CNG injectors provide 2-3 times less flow than will be needed. In addition, conventional CNG injectors are not capable of long term dry gas durability since there is a tribology issue with chrome plating and stainless alloys, the magnetic components present a soft substrate for coatings, there is inadequate bearing surface area to endure side forces, and there is inadequate impact face area during the opening cycle of the injector.

Thus, there is a need to provide a durable, high flow gaseous injector to provide the proper flow for future customer needs.

SUMMARY OF THE INVENTION

An object of the invention is to fulfill the need referred to above. In accordance with the principles of the present invention, this objective is obtained by providing an injector having an inlet and an outlet for injecting gaseous fuels into an internal combustion engine. The injector includes a valve body having an interior portion and a seat. An armature tube is in the interior portion and has a bore there-through. A valve member is associated with the armature tube. A spring has an end engaging the valve member so that the valve member is biased by the spring towards the inlet into engagement with the seat, defining a closed position of the valve member, preventing fuel from exiting the outlet. An inlet tube defines the inlet of the injector. A movable, ferro-magnetic armature is in the inlet tube and is coupled to an end of the armature tube. The armature has a bore and an end surface. The bore of the armature communicates with the inlet and with the bore of the armature tube to provide a flow path from the inlet to the interior portion of the valve body. A calibration member is engaged with the valve body and engaged with an end of the spring, opposite the end of the spring engaged with the valve member. A stator is coupled to the inlet tube and has an end surface spaced from the end surface of the armature in the closed position of the injector, thereby defining a working air gap between the end surfaces. An electromagnetic coil is disposed about a portion of the inlet tube. A ferro-magnetic housing surrounds at least a portion of the coil. When the coil is energized, magnetic flux across the working air gap moves the armature together with the armature tube towards the outlet so that the armature tube pushes the valve member off the seat to an open position while compressing the spring, permitting gaseous flow from the inlet to the interior portion, around the valve member and through the outlet.

Other objects, features and characteristics of the present invention, as well as the methods of operation and the functions of the related elements of the structure, the combination of parts and economies of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
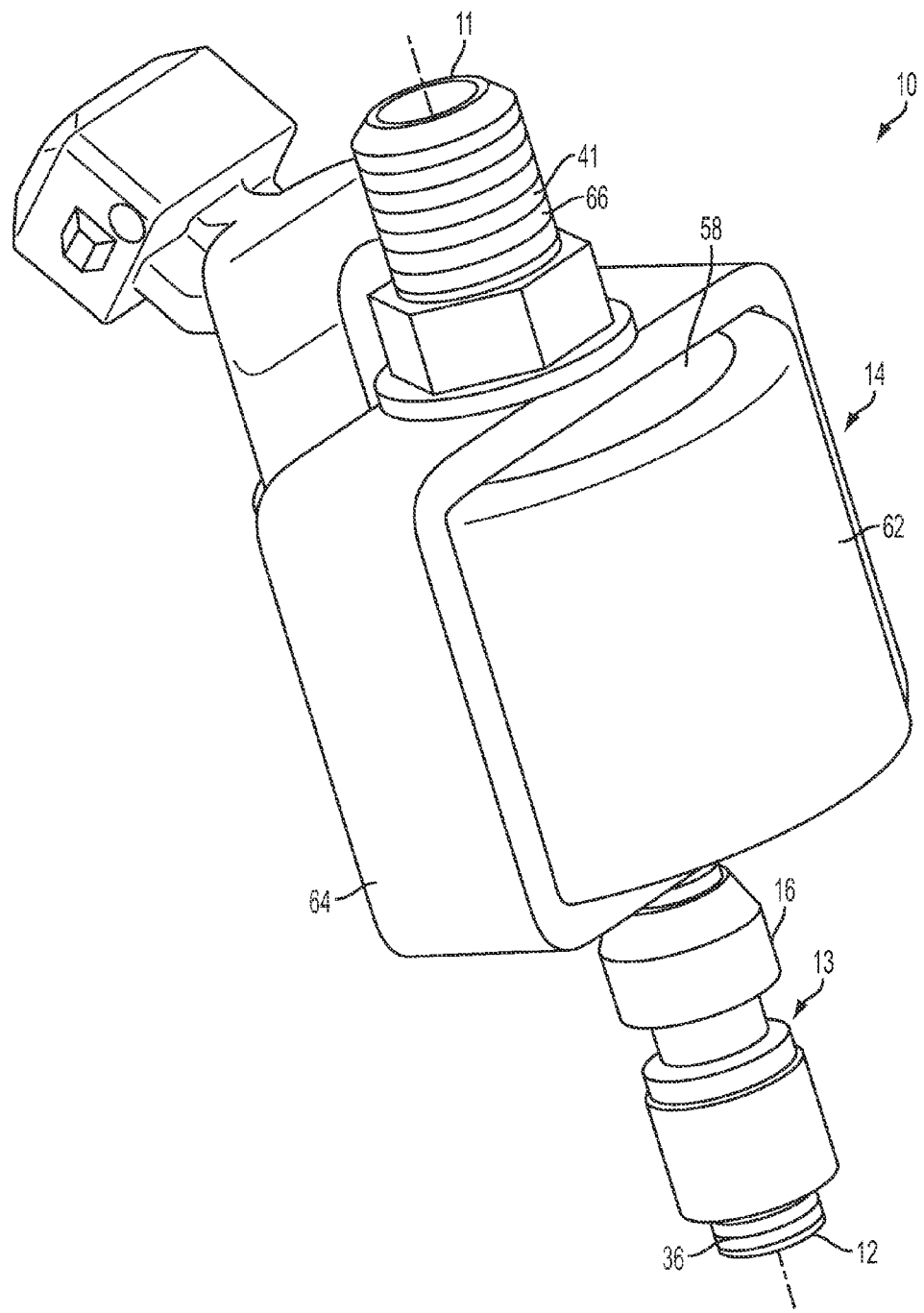
FIG. 1 is a perspective view of a gaseous injector according to an embodiment.
Figure 2:
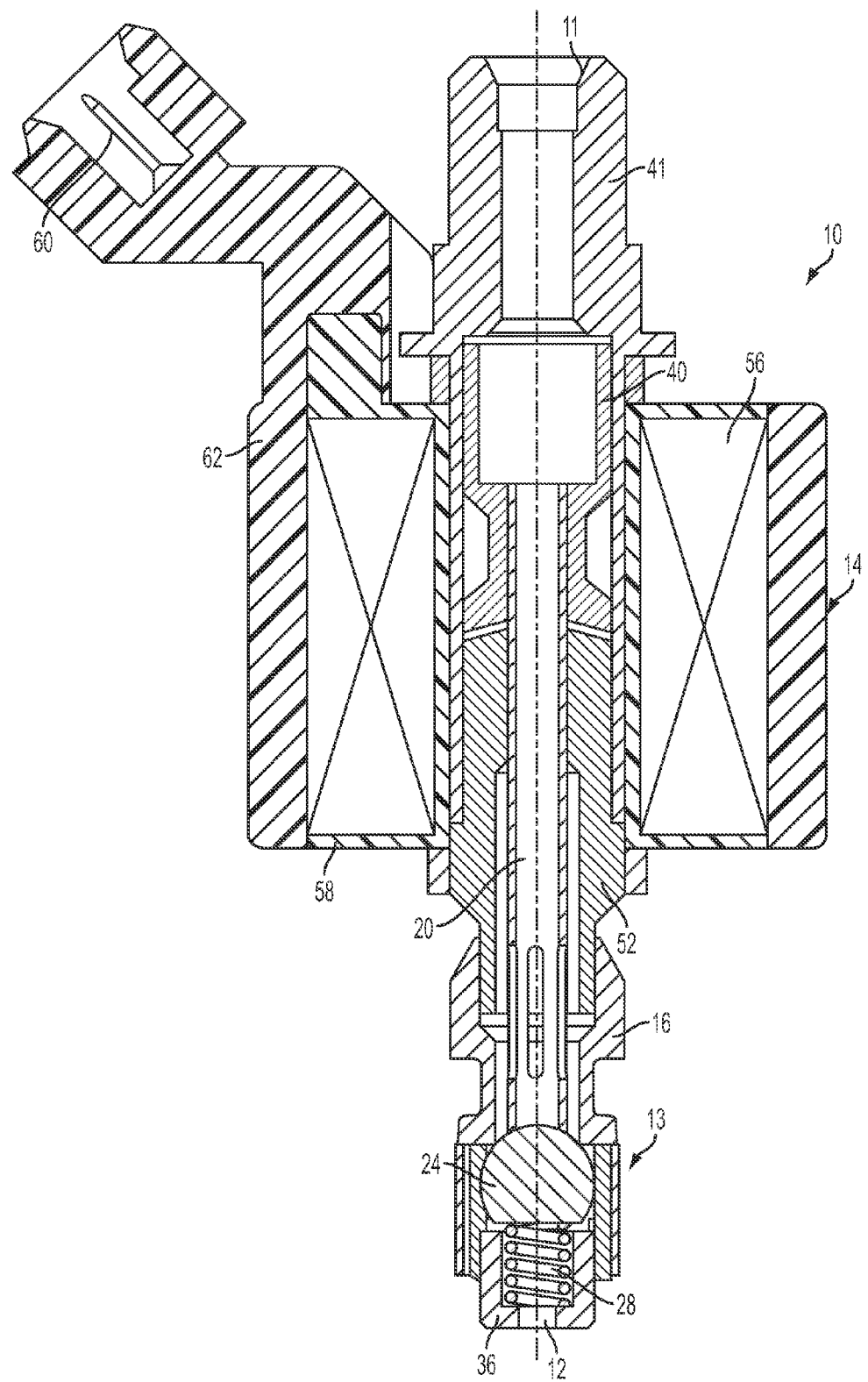
FIG. 2 is a sectional view of the injector of FIG. 1.

With reference to FIGS. 1 and 2, a solenoid actuated injector, generally indicated at 10, is shown having an inlet 11 and an outlet 12 in accordance with an embodiment. The injector 10 is constructed and arranged to inject gaseous fuels such as, for example CNG or hydrogen, into an internal combustion engine. The injector 10 includes valve group subassembly, generally indicated at 13, and a magnetic group subassembly, generally indicated at 14. The valve group subassembly 13 performs fluid handling functions, e.g., defining a fuel flow path and prohibiting fuel flow through the injector 10. The magnetic group subassembly 14 performs power functions, e.g., converting electrical signals to a magnetic driving force for permitting fuel flow through the injector 10.

Figure 3:
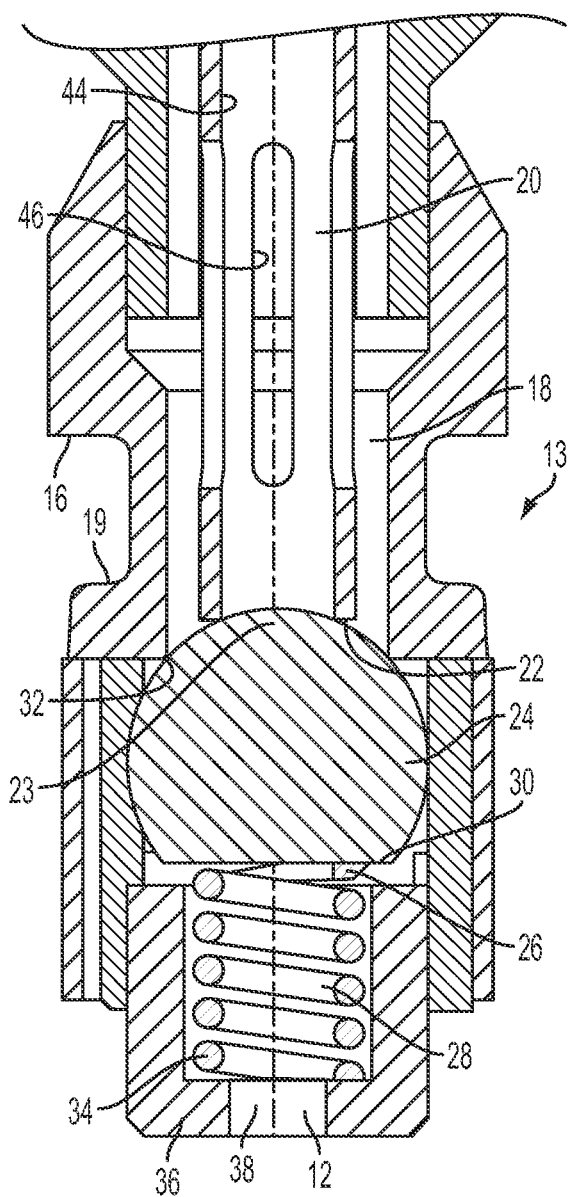
FIG. 3 is an enlarged view of the valve group subassembly of the injector of FIG. 2.

With reference to FIG. 3, the valve group subassembly 13 comprises a valve body 16 in the form of a hollow tube having an interior portion 18. The valve body 16 includes an O-ring groove 19 for receiving an O-ring (not shown) for sealingly coupling the injector 10 to a manifold. An armature tube 20 is hollow and is disposed in the interior portion 18 of the valve body 16. The armature tube 20 has an end 22 that engages a spherical end 23 of a valve member 24. An end 26 of a coil compression spring 28 engages a planar end 30 of the valve member 24 that is opposite spherical end 23. The spring 28 has a high rate for closing the injector 10. In particular, the spring 28 biases the spherical portion of the valve member 24 into sealed engagement with a seat 32, defined by an annular edge in the valve body 16, to prevent flow past the valve member 28 and out the outlet 12. The other end 34 of the spring 28 is carried by a calibration member or cup 34. The calibration cup 34 is preferably in threaded engagement with the valve body so as to be moved with respect to the valve body 16 to compress or release compression on the spring 28 to adjust and set a predetermined dynamic characteristic of the armature tube 20. The calibration cup 34 has a passage 38 there-through that defines the outlet 12 of the injector 10 and that communicates with the interior portion 18. FIGS. 2 and 3 show the injector 10 in the closed position.

Figure 4:
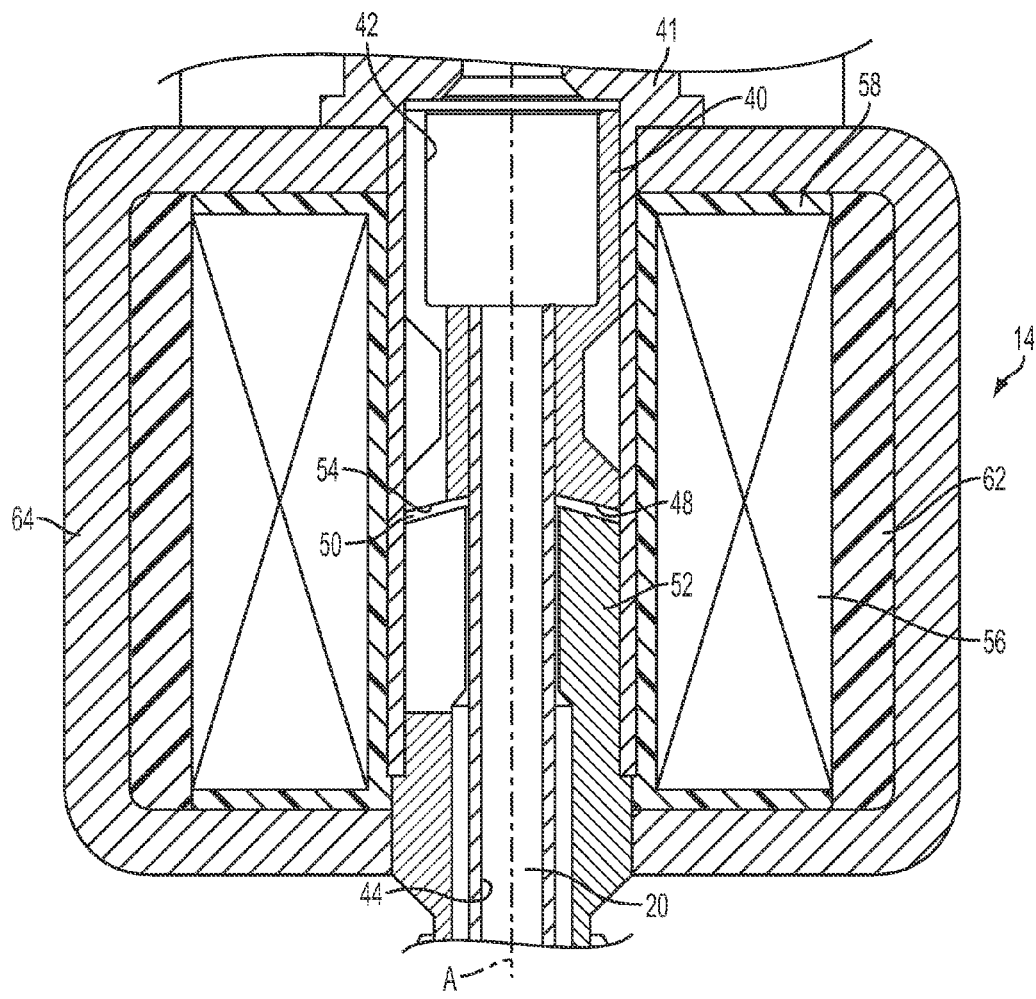
FIG. 4 is an enlarged view of the magnetic group subassembly of the injector of FIG. 2.

With reference to FIG. 4, the magnetic group subassembly 14 comprises a movable armature 40 disposed in an inlet tube 41 and coupled to an end of the armature tube 20 so that movement of the armature 40 moves the armature tube 20. The armature 40 is made of ferro-magnetic material such as insert molded 12% Cr ferritic steel. The armature 40 has a central bore 42 that communicates with the bore 44 provided through the armature tube 20. The bore 42 communicates with the inlet 11 of the inlet tube 41 and the armature tube 20 includes openings 46 (FIG. 3) to define a flow path from the inlet to the interior portion 18 and thus to the outlet 12 when the valve member 24 opens, as will be explained more fully below. The armature 40 has an angled end surface 48 that is adjacent to a mating angled end surface 50 of a ferromagnetic stator 52 to define a working gap 54 there-between, when the injector 10 is in the closed position. The axially disposed working gap 54 is the only air gap provided and thus, there is no magnetic air gap around the sides of the armature 40 and stator 52. Ends 48 and 50 are angled with respect to the longitudinal axis A of the injector 10. Although, in the embodiment the stator 52 is fixed to and separate from the valve body 16, the stator 52 can be considered to be part of the valve body 16.

As shown in FIG. 4, an electromagnetic coil 56, in the form of wire wound about a bobbin 58. The bobbin 58 is disposed over a portion of the inlet tube 41. The inlet tube 41 is coupled with the stator 52. The coil 56 is connected to a source of power via terminals 60 in an over-molded plastic connector 62. A ferro-magnetic housing 64, preferably in the form of a generally rectangular strap, is provided over portions of the periphery of the bobbin 58 and connector 62 to surround a portion of the coil 56 and thus, define a flux return path.

When energized, the coil 56 generates magnetic flux that flows in a circuit that comprises the inlet tube 41, the working air gap 54 and the housing 64. The magnetic flux across the air gap 54 moves the armature 40 axially towards the outlet 12 so that the surface 48 of the armature 40 engages the surface 50 of the stator 52. Since the armature 40 is coupled to the armature tube 20, the armature tube 20 moves with the armature 40 and pushes the valve member 24 off of seat 32 while compressing the spring 28, thereby permitting gas flow from the inlet 11, to interior portion 18 and around the valve member 24 to the outlet 12. Once the coil 56 is de-energized, the spring 28 forces the valve member 28 back into engagement with the seat 32, closing the outlet 12.

The injector 10 advantageously provides a high external force closing spring 28 that minimizes hydrogen embrittlement, particularly hot soak. Further, manifold-side calibration of the injector 10 is possible since the calibration spring 28 is external to the pressurized envelope of the injector 10. The injector 10 provides higher opening and closing speeds than conventional gaseous injectors. The working air gap 54 is provided near the center of the coil 56. The stator 52 and the armature 40 are of split-face configuration to minimize eddy loss. By using the spherical valve member 24 sealing on the annular edge seat 32, large sealing diameters and flow areas are provided. The inlet tube 41 is metal and includes external threads 66 (FIG. 1) providing a metal-to-metal inlet connector for high pressure hydrogen applications.

Although the injector 10 has been described for use with CNG or hydrogen, the injector 10 can be used in any gaseous automotive platform.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An injector having an inlet and an outlet for injecting gaseous fuels into an internal combustion engine, the injector comprising:
    a valve body having an interior portion and a seat,
    an armature tube in the interior portion, the armature tube having a bore there-through,
    a valve member associated with the armature tube,
    a spring having an end engaging the valve member so that the valve member is biased by the spring towards the inlet into engagement with the seat, defining a closed position of the valve member, preventing fuel from exiting the outlet,
    an inlet tube defining the inlet of the injector,
    a movable, ferro-magnetic armature in the inlet tube and coupled to an end of the armature tube, the armature having a bore and an end surface, the bore of the armature communicating with the inlet and with the bore of the armature tube to provide a flow path from the inlet to the interior portion of the valve body,
    a calibration member engaged with the valve body and engaged with an end of the spring, opposite the end of the spring engaged with the valve member,
    a stator coupled to the inlet tube and having an end surface spaced from the end surface of the armature in the closed position of the injector, thereby defining a working air gap between the end surfaces,
    an electromagnetic coil disposed about a portion of the inlet tube,
    a ferro-magnetic housing surrounding at least a portion of the coil,
    wherein, when the coil is energized, magnetic flux across the working air gap moves the armature together with the armature tube towards the outlet so that the armature tube pushes the valve member off the seat to an open position while compressing the spring, permitting gaseous flow from the inlet to the interior portion, around the valve member and through the outlet.

2. The injector of claim 1, wherein the end surface of the armature and the end surface of the stator are constructed and arranged to be in engagement in the open position of the valve member.

3. The injector of claim 2, wherein the end surface of the armature and the end surface of the stator are each angled with respect to a longitudinal axis of the injector.

4. The injector of claim 1, wherein the seat is an annular edge and the valve member includes a spherical portion engaging the annular edge in the closed position of the valve member.

5. The injector of claim 1, wherein the coil comprises wire would about a bobbin.

6. The injector of claim 5, further comprising a connector over-molded on the coil with the housing being a strap member disposed over portions of the connector and bobbin.

7. The injector of claim 1, wherein the calibration member is adjustably engaged with the valve body, the calibration member having a passage there-through that defines the outlet and that communicates with the interior portion.

8. The injector of claim 7, wherein the calibration member is in the form of a cup, the spring being disposed in the cup, between a surface of the cup and the valve member.

9. The injector of claim 8, wherein the spring is a compression coil spring and the valve member has a planar end engaged with the spring.

10. The injector of claim 1, wherein the working air gap is constructed and arranged to be located generally at the center of the coil, with no air gap around sides of the armature or the stator.

11. The injector of claim 1, wherein an end of the inlet tube includes external threads defining a connector.

12. The injector of claim 1, wherein the injector is constructed and arranged to deliver compressed natural gas or hydrogen gas to an engine.

13. An injector having an inlet and an outlet for injecting gaseous fuels into an internal combustion engine, the injector comprising:
- a valve body having an interior portion and an annular edge seat,
- an armature tube in the interior portion, the armature tube having a bore there-through,
- a valve member associated with the armature tube, the valve member having a spherical portion,
- a spring having an end engaging the valve member so that the spherical portion of the valve member is biased by the spring towards the inlet into engagement with the an annular edge seat, defining a closed position of the valve member, preventing fuel from exiting the outlet,
- an inlet tube defining the inlet of the injector,
- a movable, ferro-magnetic armature in the inlet tube and coupled to an end of the armature tube, the armature having a bore and an end surface, the bore of the armature communicating with the inlet and with the bore of the armature tube to provide a flow path from the inlet to the interior portion of the valve body,
- a calibration member engaged with the valve body and engaged with an end of the spring, opposite the end of the spring engaged with the valve member,
- a stator coupled to the inlet tube and having an end surface spaced from the end surface of the armature in the closed position of the injector, thereby defining a working air gap between the end surfaces,
- an electromagnetic coil disposed about a portion of the inlet tube,
- a ferro-magnetic housing covering at least a portion of coil,
- wherein, when the coil is energized, magnetic flux across the working air gap moves the armature together with the armature tube towards the outlet so that the armature tube pushes the valve member off the seat to an open position while compressing the spring, permitting gaseous flow from the inlet to the interior portion, around the valve member and through the outlet.

14. The injector of claim 13, wherein the end surface of the armature and the end surface of the stator are constructed and arranged to be in engagement in the open position of the valve member.

15. The injector of claim 14, wherein the end surface of the armature and the end surface of the stator are each angled with respect to a longitudinal axis of the injector.

16. The injector of claim 13, wherein the calibration member is adjustably engaged with the valve body, the calibration member having a passage there-through that defines the outlet and that communicates with the interior portion and wherein the calibration member is in the form of a cup, the spring being disposed in the cup, between a surface of the cup and the valve member.

17. The injector of claim 16, wherein the spring is a compression coil spring and the valve member has a planar end engaged with the spring.

18. The injector of claim 13, wherein the working air gap is constructed and arranged to be located generally at the center of the coil, with no air gap around sides of the armature or the stator.

19. The injector of claim 13, wherein an end of the inlet tube includes external threads defining a connector.

20. The injector of claim 13, wherein the injector is constructed and arranged to deliver compressed natural gas or hydrogen gas to an engine.

* * * * *